R. E. RUSSELL.
MULTIPLE OPERATION OF VAPOR ELECTRIC DEVICES.
APPLICATION FILED SEPT. 18, 1905.
921,893.
Patented May 18, 1909.
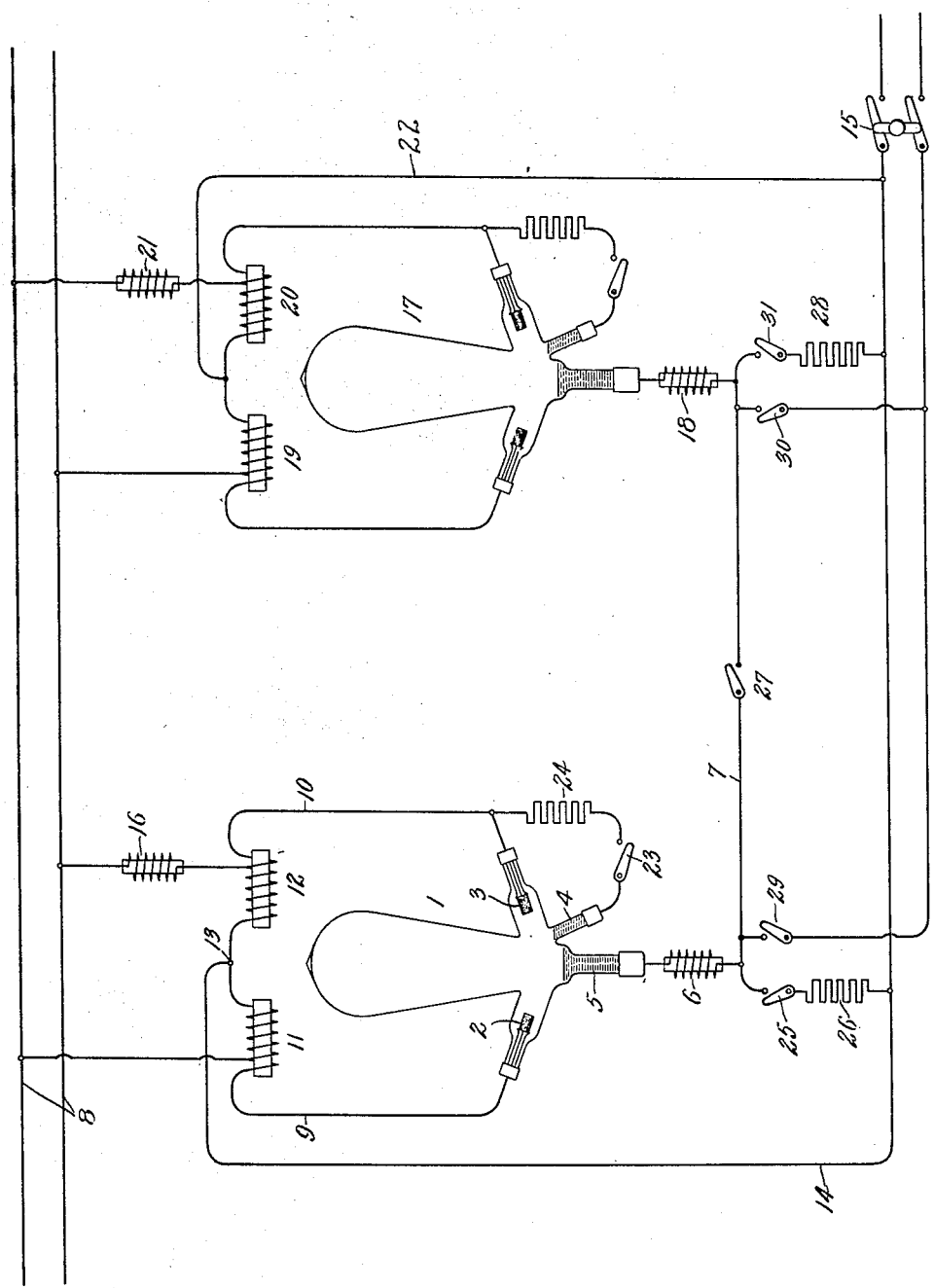
WITNESSES:
Benjamin B. Hull
Helen Oxford
INVENTOR:
Robert E. Russell,
By Albert G. Davis
Att'y.

UNITED STATES PATENT OFFICE.

ROBERT E. RUSSELL, OF SCHENECTADY, NEW YORK, ASSIGNOR TO GENERAL ELECTRIC COMPANY, A CORPORATION OF NEW YORK.

MUTIPLE OPERATION OF VAPOR ELECTRIC DEVICES.

No. 921,893.    Specification of Letters Patent.    Patented May 18, 1909.

Application filed September 18, 1905. Serial No. 278,876.

*To all whom it may concern:*

Be it known that I, ROBERT E. RUSSELL, a citizen of the United States, residing at Schenectady, county of Schenectady, and State of New York, have invented certain new and useful Improvements in Multiple Operation of Vapor Electric Devices, of which the following is a specification.

In the multiple operation of vapor electric devices such as mercury electric lamps or rectifiers, difficulty is sometimes experienced in making the devices properly divide the current or load between them with the result that one device may take all of the current while the other goes out. The device which remains in operation apparently robs the other of current so that the value of current in the latter decreases below that value at which it could maintain an arc, and the apparatus then ceases operation entirely. It is customary in order to make devices of this character operate in multiple to connect in each cathode lead a resistance or inductance device. Even with this arrangement, however, difficulty is sometimes experienced owing to the irregularities in the winding of the compensating reactance used with the rectifier or lamp. My present invention provides means whereby this trouble may be overcome and the rectifiers caused to operate properly in multiple with each other.

The novel features which characterize my invention I have pointed out with particularity in the appended claims. The invention itself, however, will be better understood by reference to the following description taken in connection with the accompanying drawings which represent diagrammatically one embodiment of my invention.

In the drawings, I have represented a system embodying two mercury vapor rectifiers arranged to operate in multiple though it is to be understood that my invention is applicable also to vapor electric lamps. The rectifier 1 comprises an evacuated envelop or receptacle of glass provided with main anodes 2 and 3, usually of artificial graphite, a mercury cathode 5, and an auxiliary starting anode 4 also of mercury. The coöperating rectifier 17 is of similar construction and requires no special description. Each rectifier is provided as usual with a compensating reactance consisting in case of the rectifier 1 of the coils 11 and 12, and in case of the rectifier 17 of the coils 19 and 20.

These reactances are connected across the alternating current leads which supply current to the main anodes of the respective rectifiers. In some cases, where it is desired to raise the voltage supplied to the rectifier, these compensating reactances may have certain additional turns in series with the anode leads as indicated, whereby the voltage applied to the anodes is raised or boosted.

The load current for each rectifier, as is well understood, flows in a circuit between the cathode and a junction point between the coils of the corresponding compensating reactance. When the two rectifiers are to supply a common load, these circuits are placed in multiple with each other across the load. Thus, in the drawings the return conductors 14 and 22 of the two rectifiers respectively are joined together as indicated while the cathodes are adapted to be connected together by the switches 29 and 30. A switch 15 connects these circuits to the load.

In starting up the apparatus, it is convenient to start the rectifiers separately on a starting resistance. Thus, the rectifier 1 is started on a resistance 26 which takes the place temporarily of the load. A switch 25 connects this resistance in circuit while the switches 29 and 27 serve for the time being to isolate the rectifier, while starting, from connection with the other rectifier 17 or with the main load. After being started up in the usual manner, the rectifier is connected to the load by the switch 29. The resistance 26 is then cut out of circuit. The rectifier 17 is similarly started and, when connected with the load, is thus in multiple with the rectifier 1.

In ordinary installations, equalizing reactances 6 and 18 are connected respectively in series with the cathode leads of the rectifiers and serve to make the rectifiers divide the load properly and thus prevent one rectifier from robbing the other of current and putting it out of operation. It sometimes happens, however, that the compensating reactances such as 11, 12, 19 and 20 are more or less unequal in value due to accidental causes in manufacture or for other reasons so that even with the presence of the equalizing reactances 6 and 18, the rectifiers fail to work properly in multiple. I have found that this trouble may be overcome by placing in series with the alternating current supply leads impedance devices such as the inductance coils 16 and 21. The tendency for one rectifier to take more current than the other is counterbalanced by the reactance corresponding to that rectifier, which reactance then consumes more voltage and reduces the voltage supplied to the rectifier. The incipient increase in current is thus checked and as a result the rectifiers are found to work properly together.

Although in the drawings I have shown only two rectifiers, it is of course obvious that any desired number may be introduced into the circuit to meet the demands for current. Moreover, it is evident that numerous modifications may be made in the embodiment of my invention, for which reason I do not wish to be limited to the details shown and described.

What I claim as new and desire to secure by Letters Patent of the United States, is,—

1. The combination of a plurality of vapor electric devices connected in multiple with each other, a source of alternating current for supplying said vapor electric devices, equalizing devices in circuit with the direct current leads of said vapor electric devices respectively, and impedances connected respectively in series with the alternating-current supply circuits of said vapor electric devices.

2. The combination of a source of alternating current, a plurality of vapor electric devices supplied therefrom and connected in multiple with each other, and means traversed by alternating current in the supply circuits of said devices for controlling the distribution of current between or among said devices.

3. The combination of a source of alternating current, vapor electric rectifiers supplied therefrom, a common load for said rectifiers, and an impedance traversed by the alternating supply current of each rectifier.

4. The combination of a plurality of vapor electric devices connected in parallel to the same source of current, reactive means connected across the anodes of each rectifier, and impedances interposed between said reactive means and said source to compensate for any inequality in said reactive means.

5. The combination of a plurality of vapor rectifier units operating in parallel on the same load, anodes for said rectifiers, a source of current connected to said anodes, and a single impedance device for each rectifier interposed between an anode and said source and in the path of alternating current flowing from said source.

6. The combination of a source of alternating current, a plurality of vapor electric devices supplied therefrom and connected in multiple with each other, and means for each of said devices for controlling the distribution of current between or among said devices, said means being connected in the supply circuit of the corresponding device and being traversed by alternating current.

In witness whereof, I have hereunto set my hand this 15th day of September, 1905.

ROBERT E. RUSSELL.

Witnesses:
   G. C. HOLLISTER,
   HELEN ORFORD.